May 19, 1959  C. E. GOETZ  2,886,858
VACUUM COOLING

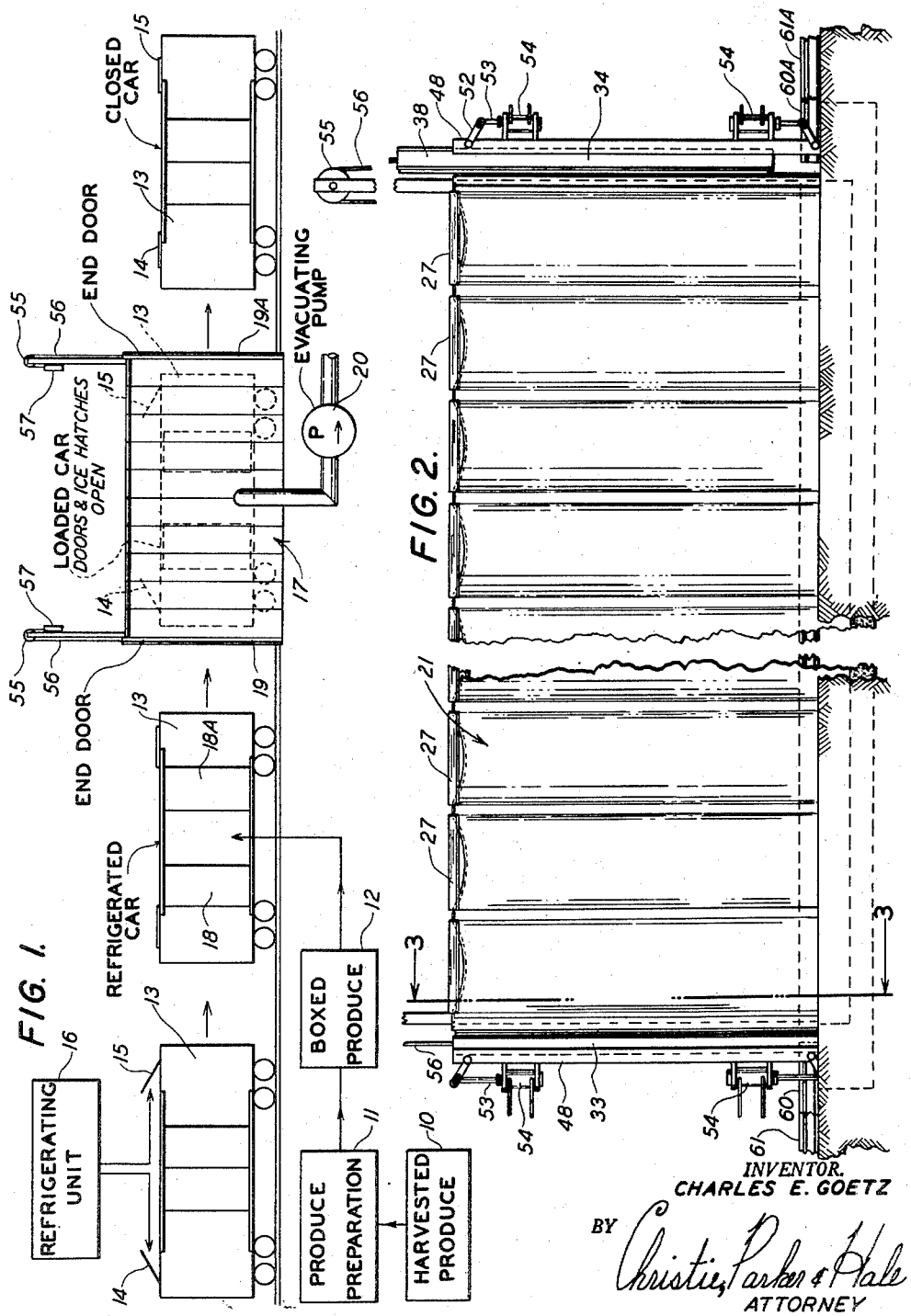

Original Filed March 25, 1954  3 Sheets-Sheet 2

INVENTOR.
CHARLES E. GOETZ
BY Christie, Parker & Hale
ATTORNEY

May 19, 1959    C. E. GOETZ    2,886,858
VACUUM COOLING
Original Filed March 25, 1954    3 Sheets-Sheet 3
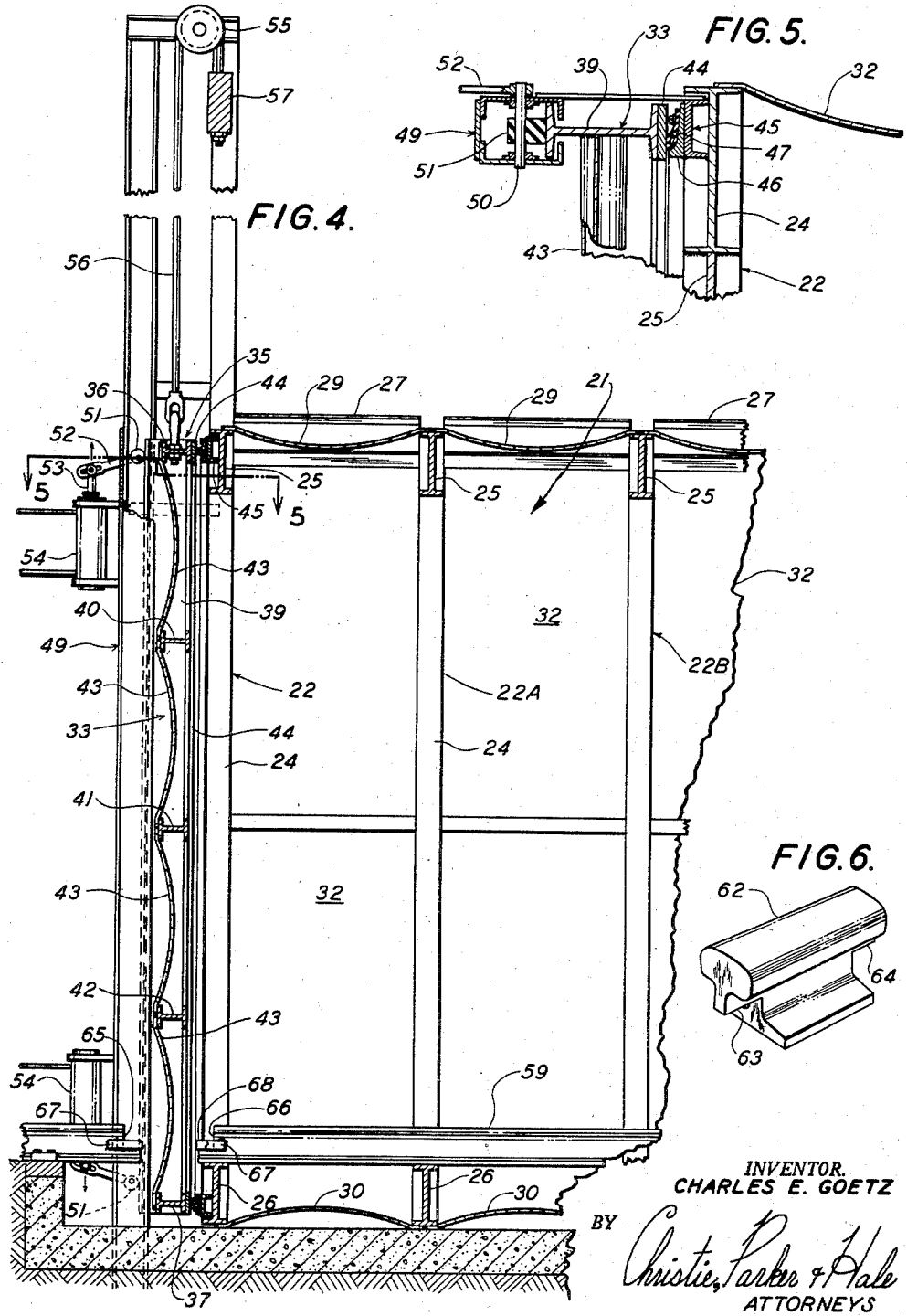
INVENTOR.
CHARLES E. GOETZ
BY
Christie, Parker & Hale
ATTORNEYS

United States Patent Office 2,886,858
Patented May 19, 1959

2,886,858

VACUUM COOLING

Charles E. Goetz, Tolleson, Ariz.

Original application March 25, 1954, Serial No. 418,517, now Patent No. 2,786,342, dated March 26, 1957. Divided and this application January 17, 1957, Serial No. 634,637

5 Claims. (Cl. 20—2)

This invention relates to vacuum cooling and particularly to a process and apparatus for vacuum precooling of agricultural produce, and is a division of my copending application Serial No. 418,517, filed March 25, 1954, and entitled "Vacuum Cooling," now Patent No. 2,786,-342 issued March 26, 1957.

Vacuum precooling of produce is a recent innovation in the art of vegetable shipping. Recent tests have proven the practicability of improving the quality of retailed produce by lowering the temperature of the produce after it has been packaged for shipment. This is now done by placing one or more partially sealed packages in an airtight chamber which is then evacuated. The reduction of air pressure within the chamber and the packaged produce allows rapid evaporation of the moisture in the outer foliage of the produce, causing a speedy reduction of temperature.

A more detailed account of present techniques of vacuum precooling of vegetables is contained in a paper on that subject by Bernard A. Friedman, which was published in the trade magazine "Industrial Refrigeration," December 1953.

The paper outlines the present practice in which the produce is harvested, prepared for marketing either in the field or in the field shed and packaged in partially sealed cartons which are then placed in a vacuum chamber to be cooled for transfer to and shipment in iced refrigerator cars.

Trucks haul the packaged produce from the various fields to nearby vacuum chambers in a short time, but the capacity of the chambers seldom equals the pace of the deliveries, so that the produce often stands in trucks exposed to high temperatures for long periods prior to the vacuum cooling process. The purpose of preserving the quality and freshness of the produce is partially defeated by the waiting period in warm temperatures.

The apparatus of my invention eliminates the harmful exposure to warm temperatures and in addition, provides a more economical procedure involving one less handling than the conventional process outlined above. The invention accomplishes these improvements by implementing a process that includes packaging prepared produce in containers and loading the packaged produce into the lading vehicle. The remaining steps of the process, as particularly claimed in my copending application, include enclosing the open laden vehicle in a cooling structure or retort, evacuating the retort to induce rapid evaporative cooling of the packaged produce, restoration of normal air pressure within the retort and removing the vehicle from the retort.

Use of the ultimate shipping vehicle, whether truck or railway car, as the produce handling means for the vacuum precooling step, gives the additional advantage of early notification to produce brokers of truck or refrigerator car numbers identifying a certain category of produce, which facilitates the distribution of the produce at the receiving end.

I have developed apparatus that is ideally suited to carrying out the above described method. The apparatus comprises a number of transverse frames that are spaced along a longitudinal axis and connected by a plurality of segmental longitudinal stringers connected between the vertical frames and a covering supported on the frames which has a concave configuration between adjacent pairs of vertical frames. Entry and exit openings are at opposite ends of the volume defined by the frames and covers, and are closed by movable means that seal these entry and exit openings.

The structure or cooling shed of the invention may be either rectangular or circular in cross-section, and preferably includes supports for a pair of railroad rails which extend from end to end of the structure. Other floor means may accommodate other vehicle types.

These and other details of the process and the apparatus of the invention are more fully explained in the following detailed specification and drawing in which:

Fig. 1 is a schematic representation of the process of the invention;

Fig. 2 is an elevational view of the cooling retort of the invention;

Fig. 4 is a fragmentary longitudinal section taken along line 4—4 of Fig. 3;

Fig. 5 is a fragmentary plan section taken along line 5—5 of Fig. 4 and illustrating details of the door-sealing method;

Fig. 6 is a perspective view of a removable rail segment; and

Figure 3:
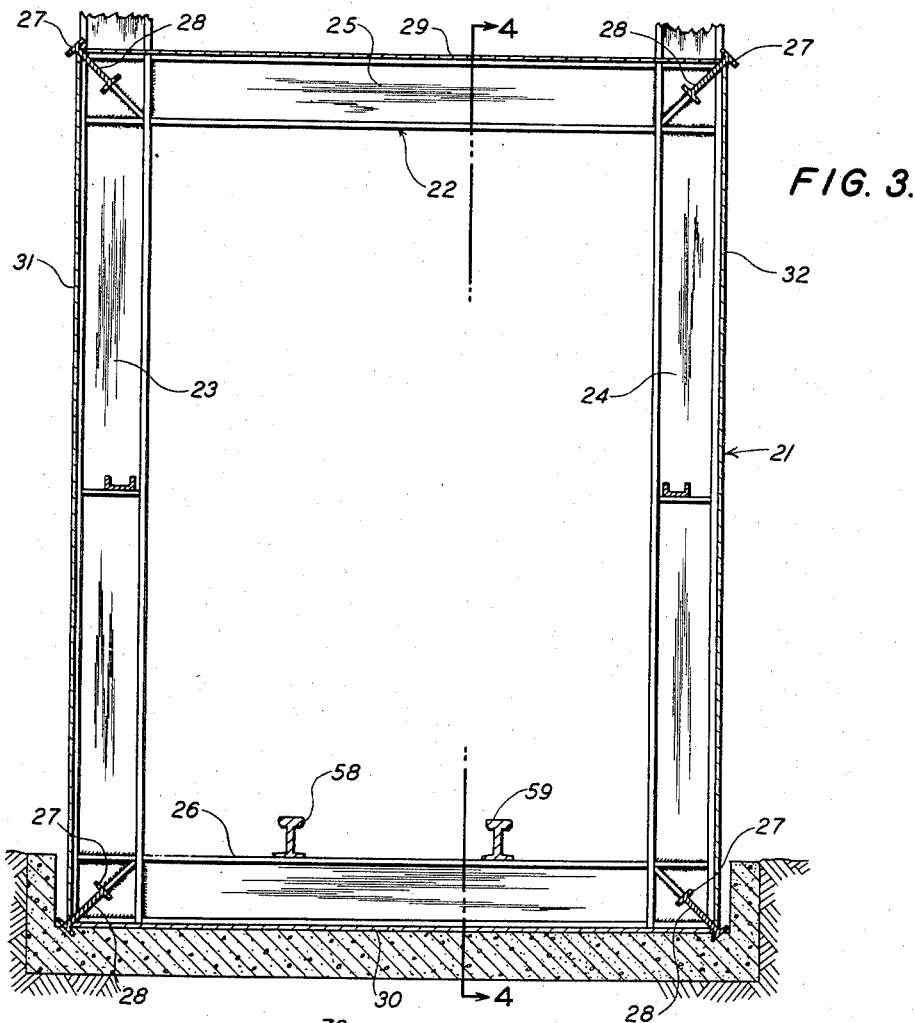
Fig. 3 is a transverse section of the retort of Fig. 2, taken along line 3—3 of Fig. 2.

As illustrated diagrammatically in Fig. 1, harvested produce 10 is prepared in the field or field shed 11 and packed for shipping in cartons or packages 12 which permit air circulation. The preparation before packaging may take the form of washing, trimming, shredding or the like depending upon the produce involved. For example, lettuce and like leafy vegetables are packed in large perforated cartons, while spiniach and some mixtures of salad vegetables are packed in perforated cellophane bags which are in turn enclosed in partially sealed cartons.

During, or prior to boxing the produce, a railroad refrigerator car 13 having ice bunker doors 14, 15 may be cooled by conventional means such as a portable refrigerating unit 16 or by ice loaded via the bunker doors. Use of a portable refrigerating unit is preferred because such units are conventionally available for this express purpose and add no moisture to the car. Ice may be used providing the waiting period between icing and produce loading is long enough to allow the ice to melt and for the resultant moisture to be removed or dissipated. Thereafter, the boxed produce 12 is loaded into the precooled car 13, the same car in which it will be shipped. The precooling step may be eliminated, with resultant economies, in all but extreme cases. The car, with its load of produce, is rolled into a cooling shed or retort 17. Loading doors 18, 18A and ice bunker doors 14, 15 are held open while the car is in residence in the retort 17 to facilitate air and vapor circulation. A pair of counterbalanced vertical doors 19, 19A are lowered and sealed against the end doorways of the retort. An evacuating pump 20 is started to draw air and water vapor from the retort 17 and from the refrigerator car 13 and its cargo.

The loaded produce cartons must not be airtight, as was explained above, so air will flow freely from the cartons during evacuation of the structure 17 and the housed car. As the air pressure diminishes, evaporation from the moist outer foliage of the produce increases, resulting in rapid evaporative cooling of the produce. All extraneous moisture other than that inherently adhered to the produce foliage should be avoided and eliminated from the car and the car housing. It is desired only to cool the produce itself. The process is impaired by fluid evaporation other than in the produce.

A predetermined degree of vacuum is maintained just long enough to reduce the temperature of the produce to the desired point, then normal air pressure is restored and the doors 19, 19A are raised and the car 13 is removed. The car is then closed tightly and dispatched to a siding. The procedure has been outlined with reference to only one refrigerator car. However, if the installation is warranted by sufficient volume or other considerations, the cooling retort can be long enough to accommodate two or more cars or trucks at the same time.

By utilizing the process detailed above, produce handlers can eliminate the harmful waiting in warm temperatures caused by low evacuating chamber capacity. The process also eliminates entirely the now conventional unloading and reloading steps necessary to use the present vacuum chambers.

The cooling structure or retort illustrated in Figs. 2 through 6 is ideally adapted to use with the vacuum cooling process because its structural features enable a retort of large capacity to withstand the pressures involved in its evacuation. The preferred embodiment comprises a substantially rectangular building 21 having a number of transverse frames 22, 22A, 22B, etc., spaced along a longitudinal axis. Each frame is rectangular. The frame 22 shown in Fig. 3 includes a pair of opposite vertical beams 23, 24 and top and bottom cross members 25, 26, respectively. The beams and cross members are preferably heavy structural I-beams. The other frame members are similarly constructed. A plurality of longitudinal segmental stringers 27, also of structural I-beam material, extend from each frame to the next adjacent frame. The stringers extend from each of the four corners of the respective frames in a direction parallel to the longitudinal axis of the structure. The web 28 of each stringer cants from a vertical line at about 45°.

Each of the spaces between successive transverse frames is covered by four plates: top plate 29, bottom plate 30 and two side plates 31, 32. The plates are identical in longitudinal cross section (Fig. 4), each curving inwardly toward the center of the structure. The curvature is substantially catenarian and is uniform for the run of the plate. The catenary curvature of the plates approximates the contour that non-rigid plates assume under the atmospheric pressure imposed on the structure when it is evacuated. Since the plates are formed to this contour, the only stresses resulting from the imposition of the atmospheric load are tensile loads enabling the use of lighter gage plates and framing.

The intersection lines of the transverse top and bottom plates 29, 30 with the vertical side plates 31, 32 coincide with the webs of the segmental stringers 27 so that the plates cannot be welded to each other. Instead, the plate ends are continuous-welded to the stringer webs 28. Since each plate is also continuous-welded to the beams of the transverse frames along their common length, airtight surfaces are formed for the entire length of the structure.

The volume of the retort in excess of that necessary to encompass the lading vehicle should be minimized. The suspension of the retort-enclosing plates from within the frame may result in volume reduction and would therefore be most desirable.

Vertical doors 33, 34 close tightly against the openings at either end of the retort. The operation and construction of each door is the same, so description of one will suffice for both.

The door 33 as shown in section in Fig. 4 comprises a rectangular frame 35 consisting of top and bottom I-beam frame members 36, 37 and relatively heavier vertical side rails 38, 39. Transverse braces 30, 41, 42 extend between the side rails and are equally spaced between the top and bottom frame members. Outer plates 43 contoured concavely in the same fashion as the plates of the structure itself are welded to the door frame to provide an airtight surface. Facing strips 44 of finished steel are fixed around the border of the inner surface of the door frame. A channel iron framework 45 projects from the end frame 22 of the structure to form a continuous rectangular jamb to which additional L-shaped facing strips 46 are attached. These latter strips receive a continuous strip 47 of the round bulb, J shaped resilient material.

The door slides in two vertical guide channels 48, 49 which restrain the door from any transverse motion but permit a certain degree of longitudinal movement necessary to effect airtight sealing, as explained below. Four shafts 50, journalled near the top and bottom of each guide channel support eccentrics 51 within the channels which bear against the vertical side rails 38, 39 of the door. Arms 52 fixed to the outboard end of each of the shafts are slidably coupled to push-rods 53 of cylinders 54 that may be either hydraulic or pneumatic and are mounted on the edges of the guide channels 48, 49. The cylinders are actuated remotely to rotate the eccentrics so that they force the door against the resilient jamb with enough pressure to insure an airtight seal. The tops of the guide channels and the vertical beams of the end frames extend upwardly above the top of the structure to support sheaves 55 over which door hoist cables 56 run. One end of each cable is fastened to the top of the door frame and the other end supports a counter-balancing weight 57. Movement of the door is controlled by conventional power means which are not shown.

A pair of internal rails 58, 59 extend through the cooling retort in line with external rails 60, 61, 60A, 61A at either end of the retort. The ends of the internal rails are separated by a gap from each of the internal rails to permit clearance for the vertical doors. A removable rail segment 62 (Fig. 6) has stepped portions 63, 64 cut into the rail web at either end which rest on oppositely stepped portions 65, 66 in the spaced ends of matching rails. Retaining strips 67, 68 welded to each side of the stepped rail ends hold the removable segment in place.

The removable segments are placed in position after the vertical doors are raised at the beginning of each process cycle in which the cooling retort is involved. The car is rolled into the retort from its waiting position on the external rails and then the segments are removed. The doors are then lowered and the pistons actuated, forcing the doors against the resilient jamb. This makes the retort airtight and the retort is then evacuated. The doors are opened at the end of the cooling period and the segments are again placed in position so that the car can be removed.

Figure 7:
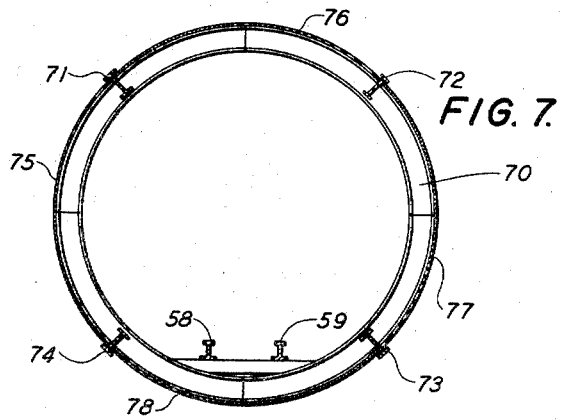
Fig. 7 is a transverse sectional elevation of a cylindrical embodiment of the apparatus.

Another embodiment of a cooling retort is illustrated in transverse cross-section in Fig. 7. A series of coaxial circular frames 70 are connected by segmented longitudinal stringers 71, 72, 73, 74. Four plates 75, 76, 77, 78 each of which is an equal segment of the total periphery of the circular frame, span the space between successive frames in a manner similar to that described for the embodiment of Figs. 2 through 6. Each plate is welded to the frame along its transverse edges and welded to the stringers along its longitudinal edges. The plates possess a catenarian contour as viewed in longitudinal cross-section similar to the contour of the plates shown in Fig. 4. Thus, the embodiment of Fig. 7 may be described as a substantially cylindrical structure having a diameter that diminishes between the transverse frames.

Door and door sealing details of this embodiment may be similar to those for the structure of Figs. 2 through 6.

Either embodiment is a structure capable of receiving the vehicle involved in the vacuum cooling process and sturdy enough to withstand the stresses involved in implementing the process.

I claim:

1. A cooling retort having means for evacuating the air enclosed therein comprising a framework, an air tight covering supported by the framework, said covering having concave areas extending between portions of the framework, movable end closure members mounted at opposite ends of the framework, a resilient sealing gasket disposed around the ends of the framework, and means operable on the closure members in closed position to displace them against the respective resilient seal gaskets so that the volume enclosed by the framework is thereby made airtight.

2. Apparatus according to claim 1 wherein the means operable to displace the closure members comprises a plurality of cams adjacent to the outer surface of the closure members, a plurality of rotatable cam shafts each of which is fixed to one of the cams, and a like number of actuating pistons and lever arms linking each of the pistons to a cam shaft.

3. A cooling retort having means for evacuating the air enclosed therein comprising a plurality of transverse frames spaced along a longitudinal axis, a plurality of longitudinal stringers connected between the frames, a substantially rigid airtight covering supported on the frames, and movable end closure members mounted at the outer face of the respective end frames, the covering being contoured so as to be substantially concave with respect to the retort exterior in the areas between adjacent transverse frames.

4. A cooling retort having evacuating means connected to the interior thereof comprising a plurality of transverse frames spaced along a longitudinal axis, a plurality of longitudinal stringers connected between the frames, an airtight covering supported on the frames, the covering being contoured so as to be substantially concave with respect to the retort exterior in the areas between adjacent transverse frames, movable end closure members mounted at the outer face of the respective end frames so as to hermetically seal the retort at the outer faces, a pair of inner rails extending through the structure in alignment with outer rails extending away from at least one end of the structure, the inner and outer rails being spaced apart in the region of the closure member, and removable rail segments adapted to connect the inner and outer rails when the closure member is open and to be removed to permit the closure member to be closed.

5. A cooling retort having evacuating means connected with the interior thereof and comprising a plurality of transverse frames spaced along a longitudinal axis, a plurality of longitudinal stringers connected between the frames, a rigid airtight covering supported on the frames, the covering being contoured so as to be substantially concave with respect to the retort exterior in the areas between adjacent transverse frames, and movable end closure members mounted at opposite ends of the framework, a resilient air sealing gasket disposed around the ends of the framework, and means operable on the closure members in closed position to displace them against the respective sealing gasket so that the cooling retort is hermetically sealed.

References Cited in the file of this patent

UNITED STATES PATENTS

| | | |
|---|---|---|
| 742,953 | Alphin | Nov. 3, 1903 |
| 2,164,143 | Munters | June 27, 1939 |
| 2,173,076 | Stetson | Sept. 12, 1939 |
| 2,634,590 | Beardsley | Apr. 14, 1953 |
| 2,774,230 | Kasser | Dec. 18, 1956 |